Jan. 3, 1967  W. J. ZIPPER  3,295,820
VALVE MEANS
Filed April 27, 1964
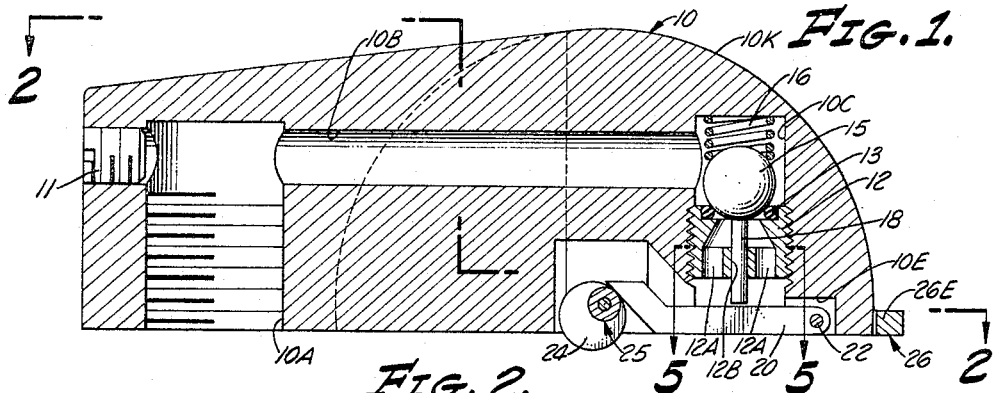
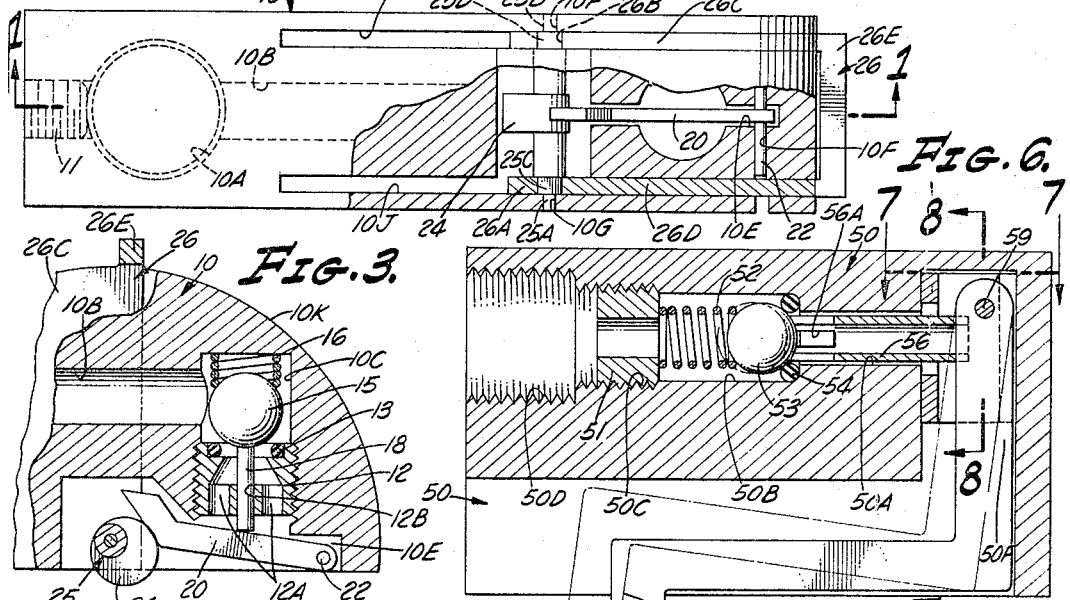
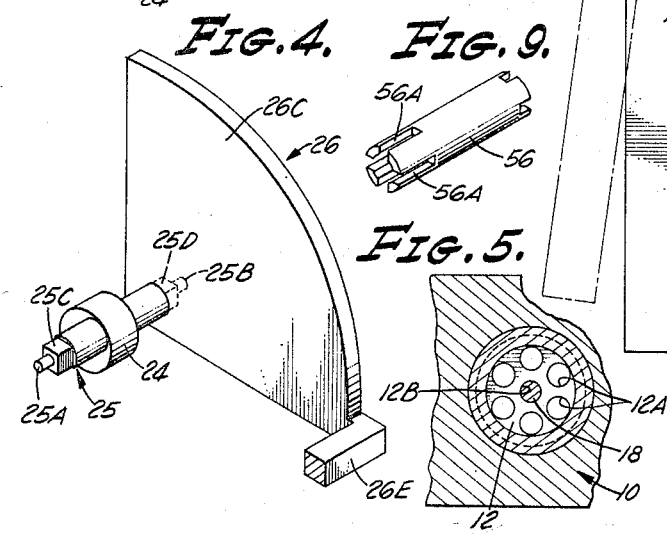
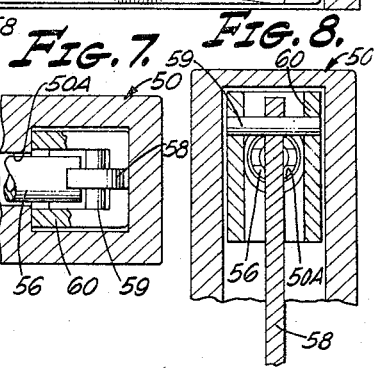
INVENTOR.
WALTER J. ZIPPER
BY Lyon & Lyon
ATTORNEYS United States Patent Office 3,295,820
Patented Jan. 3, 1967

3,295,820
VALVE MEANS
Walter J. Zipper, Santa Monica, Calif., assignor to Nuid Engineering Corporation, Los Angeles, Calif., a corporation of California
Filed Apr. 27, 1964, Ser. No. 362,798
7 Claims. (Cl. 251—229)

The present invention relates to valve means particularly useful for manually dispensing various liquids, beverages, syrups and soda, and has particular utility in faucets in soda fountains.

Briefly, two modifications of the present invention are disclosed, each using a ball and an O-ring as the valve sealing elements, and in each case the ball is moved from its O-ring seat upon movement of a lever against the action of a coil compression spring which normally urges the ball toward its seat and also the actuating lever to its off position. Using these constructions, simple and small faucets result which are inexpensive to manufacture and service and when in use may be operated conveniently with little effort in dispensing fluids with sanitation.

It is therefore a general object of the present invention to provide improved valve means and faucet constructions having the above indicated features.

A specific object of the present invention is to provide novel faucet constructions using a ball and an O-ring as the valve elements.

Another specific object of the present invention is to provide improved faucet constructions particularly useful in soda fountains, with the manually operable element of the faucet being conveniently actuated in the sanitary dispensing of fluid.

Another specific object of the present invention is to provide faucet constructions which are simple and inexpensive, with a small number of parts which may be readily disassembled and assembled in those instances where servicing and cleaning may be required and yet which are capable of sealing high pressures against leakage in the off position of the faucet.

Another important feature of the present invention is that the valve is constructed such that actuating means extends through the fluid discharge opening.

Another specific object of the present invention is to provide a valve construction of this character wherein the fluid discharge opening functions not only as such but also as a means through which valve actuation means extends for purposes of achieving a simple, compact and inexpensive construction.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGS. 1–5 relate to one form of the invention, FIG. 1 being generally a longitudinal sectional view as indicated by the arrows 1—1 in FIG. 2; FIG. 2 is a sectional view as indicated by the arrows 2—2 in FIG. 1; FIG. 3 illustrates a portion of the construction in FIG. 1, but with the valve in its open position; FIG. 4 is a perspective view showing a portion of the manually operable element in the previous figures as well as a cam operated thereby; FIG. 5 is a sectional view taken generally as indicated by the arrows 5—5 in FIG. 1.

FIGS. 6–8 relate to another form of the present invention, FIG. 6 being generally a longitudinal sectional view, and FIGS. 7 and 8 being sectional views taken generally as indicated by the arrows 7—7 and 8—8, respectively, in FIG. 6.

FIG. 9 is a perspective view illustrating one of the elements shown also in FIG. 6.

Referring to the form of the invention disclosed in FIGS. 1–5, the same includes a valve body 10 formed from a generally rectangular block of steel. The valve body 10 is provided with a screw-threaded tapped opening 10A for screw-threadedly attaching the composite structure to a threaded nipple (not shown) or the like of a receptacle or tank containing the fluid which is to be dispensed under pressure. A bore hole 10B is drilled or otherwise formed to communicate the upper end of the blind bore hole 10A with a blind bore hole 10C which is designated as the valve chamber. After the bore hole 10B is drilled, one end of the same is closed by a small threaded plug 11. The blind bore 10C is tapped to screw-threadedly receive a valve seat retaining element 12 which, as shown, is shouldered to receive an O-ring 13, such O-ring 13 being a seat for a ball 15 which is urged against seat 13 by a coil compression spring 16.

The seat retaining element 12 is formed with a series of circumferentially disposed apertured portions 12A for the flow of fluid and also a central apertured portion 12B for slidably receiving a ball actuating pin 18. The pin 18 may be either a separate element or an integral part of the ball 15. One end of the pin 18 contacts the ball 15 and the other end of pin 18 is contactable with a cam operated lever 20.

The lever 20 is disposed within a milled slotted portion 10E of body 10, with one end thereof pivoted on a pin 22 which is disposed within a bore hole 10F in valve body 10. The other end of lever 10E is engageable with a cam 24 formed as an integral part of a shaft 25, as illustrated particularly in FIG. 4.

This shaft 25 has round end portions 25A and 25B and adjacent square portions 25C and 25D, the round portions 25A and 25B fitting in slightly oversized aligned apertured portions 10F, 10G of valve body 10, and the square portions 25C and 25D cooperating with slightly oversized square apertured portions 26A and 26B in opposite parallel extending plate portions 26C and 26D of the manually actuating element 26 which has these two plate portions 26C and 26D joined by an integrally formed square strap element 26E. The plate portions 26C and 26D are freely movable as a unit in parallel extending slotted portions 10H and 10J in valve body 10.

The round end portions 25A, 25B and square portions 25C and 25D are sufficiently prolonged in the longitudinal direction of shaft 25 to allow the assembly, as shown in FIG. 2, with the shaft 25 being rotatably supported in housing 10 and with the square portions 25C and 25D engaging the actuating element 26C to rotate the cam 24 upon operation of the actuating element 26.

It is seen that the plate portions 26C and 26D, as exemplified in FIG. 4, are formed with an arcuate end so as to conform and lie generally flush with the arcuate end 10K of valve body 10.

In operation of the faucet shown in FIGS. 1–5, the faucet is normally closed since the ball 15 is pressed against its seat 13 by spring 16, and also at this time the lever 20 is engageable with the lowest portion of cam 24 and correspondingly, the actuating element 26 is in its lowermost position shown in FIG. 1. To operate the faucet to its open position, the actuating element 26 is moved upwardly to its position shown in FIG. 3 with pivotal movement, the same being accomplished about the axis of shaft 25 on which cam 24 is mounted. The resulting rotation of the cam 24 moves the lever 20 upwardly to cause the pin 18 to move the ball 15 from its O-ring seat 13 against the action of coil compression spring 16. It will be observed that in the condition shown in FIG. 3 manual effort is required to maintain the actuating member 26 in its position illustrated and that when such manual effort is released, the spring 16 is effective to move the ball 15 against its seat and also to apply a force through lever 20 to cam 24 to return the actuating element 26 to its off position. The spring 16 thus serves a dual function.

Referring now to the form of the invention shown in FIGS. 6–9, the same includes a valve body 50 formed from a generally rectangular block of metal, the same being formed with four coaxial bores 50A, 50B, 50C and 50D of increasing diameter in that order. The bore 50D is screw-threadedly tapped for mounting on a nipple element (not shown) or the like of a container or conduit therefrom containing the liquid to be dispensed under pressure. The bore 50C is also screw-threaded to receive a centrally apertured sleeve or nut element 51 to provide a seat for one end of a coil compression spring 52 within the bore or chamber 50B, the other end of spring 52 contacting a ball 53 to urge the same against the O-ring seat 54 which is retained by the shouldered portion between bores 50B and 50A. A tube 56 having bifurcated portions at each end as perhaps best seen in FIG. 9 is slidably received within the bore 50A. Such bifurcated portions on one end partially straddle a portion of an actuating lever 58 in the form of a generally Z-shaped plate, such lever 58 being pivotally mounted at its upper end on a pin 59 having opposite ends fitted into a hollow generally round insert 60. The insert 60 is fitted within a generally round opening 50F. Such insert 60 is apertured to receive one end of tube 56 and is also slotted to accommodate the upper portion of lever 58. Also, the housing 50 is slotted to accommodate movement of the lever 58 which is movable between the full line and the dotted line positions shown in FIG. 6 corresponding respectively to the off and on conditions of the faucet.

In operation of the faucet shown in FIGS. 6–9, the faucet is normally closed by the spring pressed ball 53 engaging its O-ring seat 54, and the tube 56 is then in a position to maintain the actuating lever 58 in its full line position shown in FIG. 6. To open the faucet, the lever 58 is moved to its full line position, and such movement of the lever 58 results in the tube 56 moving to the left in FIG. 6 to move the ball 53 from its seat against the action of coil compression spring 52. In such case, fluid is then free to flow from the valve chamber 50B, through the bifurcated portions 56A of tube 56, through tube 56 and out of the dispensing opening 50F. The faucet, as shown also in FIGS. 1–5, is self-closing in that when manual effort on the lever 58 is released, the lever 58 is returned to its off position under the influence of the spring 52 which has the additional function of returning the ball 53 against its seat 54 to close the faucet.

In some instances, it is desirable that the valve described above be not self-closing, i.e. the valve may be manually adjusted to a different open condition, with the adjustment being retained after release of manual effort. Thus, for example, the arrangement shown in FIGS. 1–5 may be modified to incorporate some friction means between the actuating lever 26 and the casing 10. Such friction means may be a flat bowed spring washer or a weak split lock washer on the shaft portion 25B and sandwiched between adjacent portions of the casing 10 and the lever arm 26D. The spring or lock washer in such case provides enough pressure between the lever 26 and the casing 10 to retain the lever 26 in any one of its actuated positions.

The arrangement described in FIGS. 1–5, particularly when modified by incorporation of a spring washer or other friction means, is useful as a faucet in households' fixtures for controlling the flow of hot or cold water to a lavatory or sink. While only one valve is disclosed, the structure lends itself to modification whereby two of such valves illustrated in FIG. 1 may be placed side-by-side and, indeed, incorporated in a single casing or housing 10 with the individual lever portions 26E of each valve being aligned in the fully open, fully closed and correspondingly the same partially open condition and for convenient one-hand control of the lever portions 26E of both such valves, one of which controls hot water and the other controls cold water. Also, in such case, the relative position of the two lever portions 26E then provides an indication of the proportions of hot and cold water being dispensed.

Referring to FIG. 6, another form of the invention may involve the elimination of tube 56 with the spacing between the ball 53 and lever 58 being shortened and with a projection on the lever 58 extending through the bore 50A to contact and actuate the ball 53 from its seat 54. In other words, in this modification the lever 58 is provided with an integral extension to accomplish the function of the tube 56 in FIG. 6.

An important feature of the present constructions is that the valve actuating means extends through the outlet or fluid dispensing opening. Thus, comparing FIGS. 1 and 6, it is noted that the pin 18 in FIG. 1 and the lever 58 extends through the fluid dispensing opening in which case such fluid dispensing opening serves not only its normal function as such but also as an access and passageway for a part of the valve actuating mechanism, with the result that a simple, compact and inexpensive construction is provided.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A faucet construction including a housing, an O-ring seat, first means retaining said seat in said housing, a ball, a coil compression spring acting between said housing and said ball normally urging said ball against said seat, lever means, second means pivotally mounting said lever means on said housing, and third means connected between said lever means and said ball for moving said ball from said seat against the action of said spring upon movement of said lever, said spring being effective to move said ball against said seat and to move said lever means to an Off position, said first means including a shouldered portion of said housing, said third means including a tube having a bifurcated end engaging said ball with the other end of said tube engaging said lever means, said housing having a first, second and a third aligned bore which are progressively of larger size in that order, said tube being slidably mounted in said first bore, said ball and spring being in said second bore, and said third bore being threaded to mount the housing.

2. A faucet construction as set forth in claim 1 in which said tube has a bifurcated end engaging said lever means.

3. A faucet construction as set forth in claim 2 in which said lever means is pivotally mounted on an insert fitted into a cavity portion of said housing.

4. A faucet construction as set forth in claim 3 in which a threaded element is threaded in said second bore and engages one end of said spring.

5. A faucet construction including a housing, an O-ring seat, first means retaining said seat in said housing, a ball, a coil compression spring acting between said housing and said ball normally urging said ball against said seat, lever means, second means pivotally mounting said lever means on said housing, and third means connected between said lever means and said ball for moving said ball from said seat against the action of said spring upon movment of said lever, said spring being effective to move said ball against said seat and to move said lever means to an Off position, said lever means being generally U-shaped having parallel legs thereof movable in slotted portions of said housing, a shaft having opposite ends rotatably mounted in said housing, means connecting said shaft to said legs, a cam on said shaft, a lever pivoted on said housing and engaging said cam, and means connected between said lever and said ball for moving the same from its seat upon movement of said lever means.

6. A faucet as set forth in claim 5 in which the last mentioned means is a pin, said seat being recessed in a seat retainer threaded in said housing, and said pin being slidably mounted in said seat retainer.

7. A faucet construction as set forth in claim 5 in which said legs are generally flat plate elements guided in said slotted portions, said legs lying within the confines of said housing in the closed position of the faucet with the leg interconnecting said legs being outside of said housing in all positions of said faucet.

References Cited by the Examiner

UNITED STATES PATENTS

| 612,268 | 10/1898 | O'Lally | 251—156 |
|---|---|---|---|
| 2,444,889 | 7/1948 | Braidwood | 251—339 |
| 3,174,519 | 3/1965 | Pizzurro | 251—353 |

FOREIGN PATENTS

| 410,623 | 3/1910 | France. |
|---|---|---|
| 1,228,201 | 3/1960 | France. |
| 331,766 | 7/1930 | Great Britain. |

M. CARY NELSON, *Primary Examiner.*

W. R. CLINE, *Assistant Examiner.*